United States Patent [19]
Brown

[11] Patent Number: 5,575,567
[45] Date of Patent: Nov. 19, 1996

[54] SURFACE TENSION BEARINGS AND SEALS

[75] Inventor: Forbes T. Brown, Bethlehem, Pa.

[73] Assignee: Competitive Technologies, Inc., Bethlehem, Pa.

[21] Appl. No.: 344,986

[22] Filed: Nov. 25, 1994

[51] Int. Cl.[6] .......................... F16C 33/82; F16C 32/06
[52] U.S. Cl. .......................... 384/132; 384/100; 384/368
[58] Field of Search .................................. 384/8, 12, 13, 384/100, 107, 114, 121, 322, 368, 372, 385, 397, 132; 277/80, 135

[56] References Cited

U.S. PATENT DOCUMENTS

| | | | |
|---|---|---|---|
| 2,980,473 | 4/1961 | Tanis | 384/368 |
| 3,230,021 | 1/1966 | Nablo et al. | 384/397 |
| 3,262,744 | 7/1966 | Thomas | 384/368 |
| 3,436,131 | 4/1969 | Lode | 384/100 X |
| 3,439,961 | 4/1969 | Stiles | 384/114 |
| 3,530,728 | 9/1970 | Evans et al. | 384/248 X |
| 3,778,123 | 12/1973 | Hendler et al. | 384/132 |
| 4,485,628 | 12/1984 | Jones | 277/135 X |
| 4,614,445 | 9/1986 | Gerkema et al. | 384/132 X |
| 4,671,679 | 6/1987 | Heshmat | 384/100 X |

*Primary Examiner*—Thomas R. Hannon
*Attorney, Agent, or Firm*—Michael R. Novack

[57] ABSTRACT

A seal for use in a gap between two non-contacting solid members, comprises a pool of fluid, the pool being anchored in a first of the members and contacting the second of the members, the pool being detachable from the second member in response to a pressure differential within the gap, and a bearing in a gap between two solid members used in a micromechanical pump, comprising a disk member suspended between the non-contacting solid members, and a pool of a first liquid between a first of the solid members and a first surface of the disk member, a second fluid in contact with a second surface of the disk member, the second fluid being dielectric, and an electrical potential applied across the disk member and the second fluid, the disk member being moveable in response to the electrical potential.

4 Claims, 8 Drawing Sheets

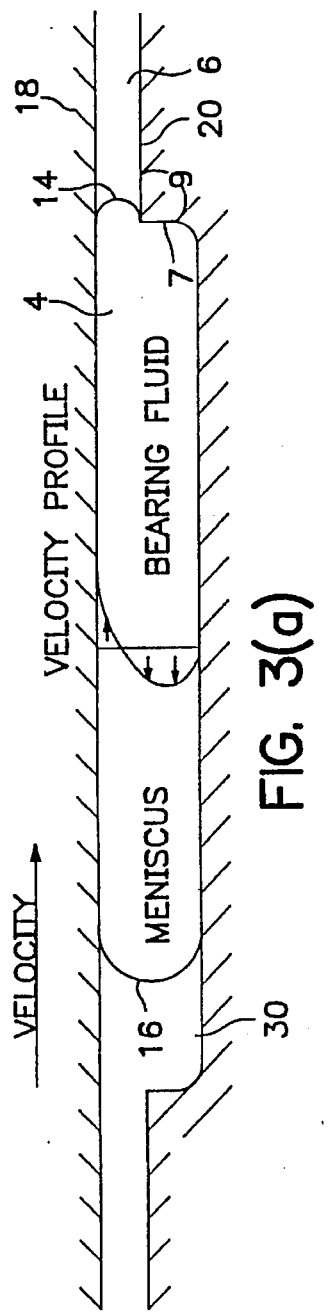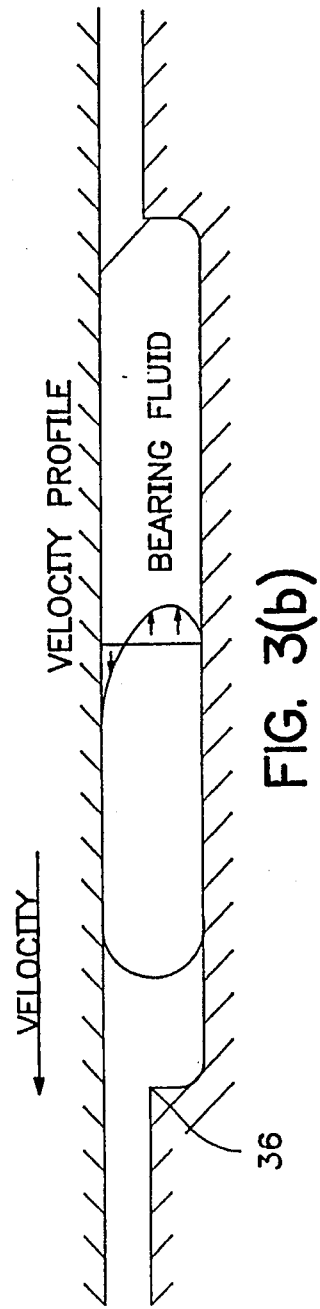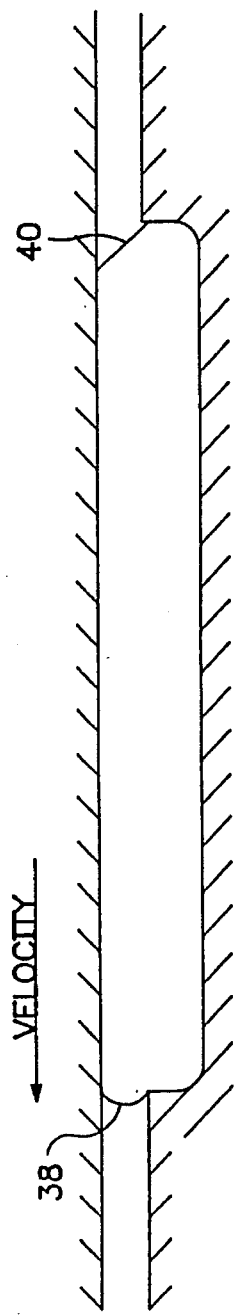

FIG. 7
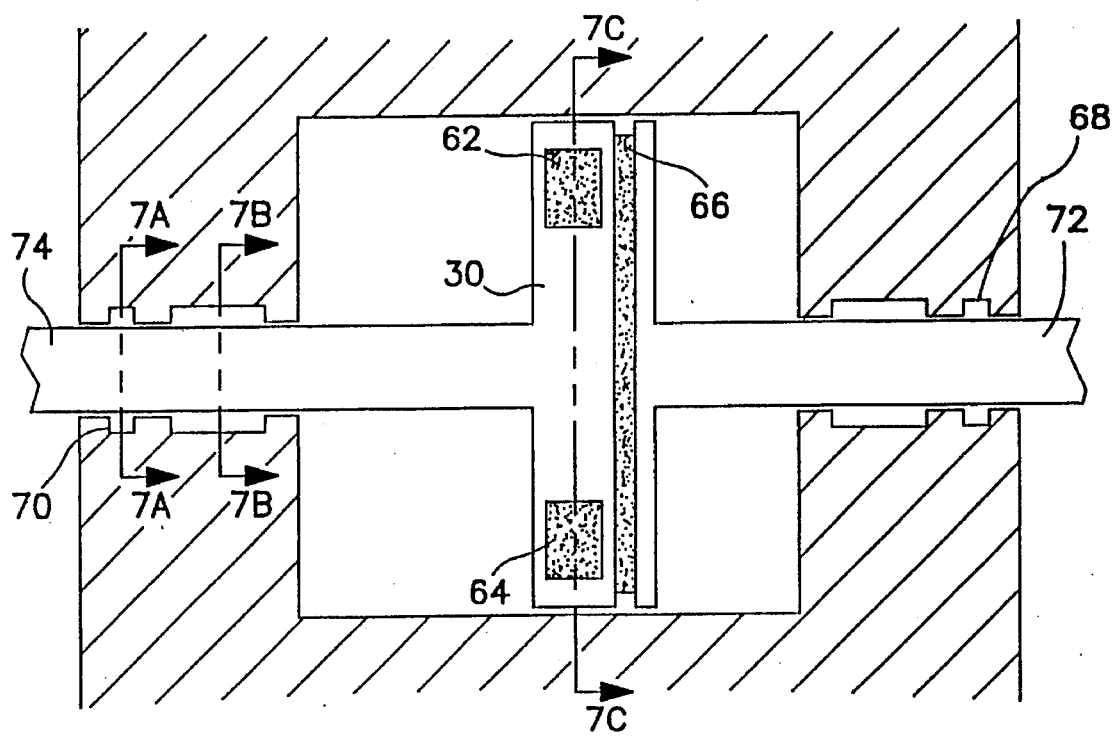
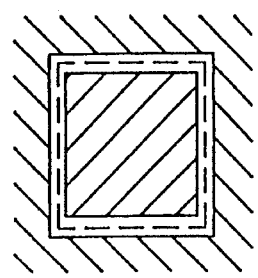
FIG. 7A
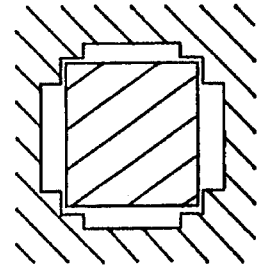
FIG. 7B
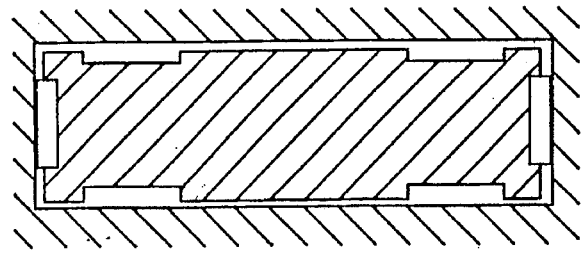
FIG. 7C 5,575,567

SURFACE TENSION BEARINGS AND SEALS

FIELD OF THE INVENTION

This invention relates to improved bearings and seals, and more specifically, to the use of fluids as bearing and seal members in micromachines.

BACKGROUND

The technology of bearings lies at the heart and construction of machines of all sorts. The desire is to allow relative shear motion between two mating surfaces despite their support of a substantive normal force. Low shear forces are preferred to increase the mechanical efficiency of the machine, reduce frictional heating and wear of the surfaces, and to reduce the formation of wear particles which can interfere with the operation of the machine or contaminate the environment.

There are a variety of bearings in use today. The most basic design of a bearing is one in which the two mating surfaces rub on one another directly. This type of bearings generates heat, and can contaminate the environment when one or both of the surfaces in contact begins to break down. Bearings can be coated with a thin layer of solid low-shear strength material, which localizes the contact regions allowing for easier shearing. However, these bearings still generate heat, have a long life, and do not give a significant shear force. Other designs of bearings employ liquid or solid lubricant between the mating surfaces to provide a lower shear force, and to dissipate heat. Contact of mating surfaces may be inhibited through the use of anisotropic molecular layers. However, these bearings give a significant shear force, and require servicing.

Hydrodynamic bearings, which are formed by squeezing a viscous fluid into a narrowing channel, prevent the mating of surfaces, but fail to operate at low relative velocities, and require routine servicing. Hydrostatic bearings also prevent contact of the mating surfaces through the use of fluid which is pumped through combination of fixed and variable orifices. However, hydrostatic bearings require power for operation, and are expensive to manufacture.

Electrostatic and magnetic bearings prevent contact of mating parts through the use of controlled electrostatic or magnetic fields and forces. Usually, an electronic control system continuously adjusts the fields to compensate for disturbances, particularly when there is no nominal relative velocity of the mating surfaces. However, electrostatic and magnetic bearings require power for operation, do not provide a large normal force, and are expensive to produce.

Flexures are used as an alternative to bearings. Flexures support a load in one direction and allow motion in another. However, flexures have limited displacements and a restraining shear force.

One growing area of use for bearings is in micromachines. Solid flexure member are widely used in micromechanical systems (e.g. microvalves and micropumps) to provide mechanical support and sealing. Various solid flexure constraints have been widely used in micromechanical systems to support members which have small displacement only. The most common examples are slender cantilever beams such as used in comb drives and diaphragms used in pressure sensors. Although these operate well for sensors, flexures are restricting for the output of actuators. Solid-to-solid contact generates unacceptable friction for microstructures which cannot be lubricated in the conventional manner of larger structures, and which can be damaged by the formation of wear particles in the environment. Rolling bearings were employed by Fujita and Omodaha, but only for larger actuators.

As with bearings, check valves have widespread applications. Conventional check valves employ a moveable or flexible solid member which seals upon contact with a valve seat. This design may subject the device to excessive wear. Those with flexible members are typically larger than desired. Therefore, there exists a need to decrease the response time of current check valves.

It is among the objects of the present invention to provide bearings and seals which overcome the limitations associated with prior art bearings, seals and check valves described above.

SUMMARY

Applicant utilizes the properties of surface tension of fluids to advantage in bearing and seal applications to eliminate the need for solid member support, resulting in unlimited transverse motion. Applicant provides a bearing which prevents contact when there is no relative velocity, without requiring a continuous flow of fluid. Also, Applicant provides an improved check valve that is not subjected to typical wear of prior art check valves, and which provides an improved response time to applied pressures.

Applicant provides such a device by utilizing small drops of liquid "pools", or gas "bubbles", in a gap formed between two non-contacting solid members. In a preferred embodiment the pools of liquid are seated in recessed "pads" of one of the solid member supports. The bubble of gas may be surrounded by a liquid, or if a liquid pool is employed, the pool may be surrounded by a gas or another immiscible liquid. As the two surfaces are moved together, the constancy of the contact angle (defined below), if greater than 90°, results in increased meniscus curvature and increased internal pressure. As the contact area increases, further stiffening of the bearing takes place. Liquid metals such as mercury and gallium are preferable since they are highly immiscible with most fluids, their contact angle is greater than 90° on most surfaces, and their surface energies (tensions) are large. The location of individual bearing pads within a system can be arranged to accommodate a wide variety of load conditions and requirements. In a further embodiment, the same properties of surface tension can be employed to create a seal between non-contacting parts.

Further features and advantages of the invention will become more readily apparent from the following detailed description when taken in conjunction with the accompanying drawings.

BRIEF DESCRIPTION OF THE DRAWINGS

FIGS. 3a–3c is a cross section of a bearing and associated bearing pad in accordance with an embodiment of the present invention.

FIGS. 7, 7a–7c 8, and 9, are various cross sections of devices employing bearings and seals of embodiments of the present invention.

DETAILED DESCRIPTION

Figure 1:
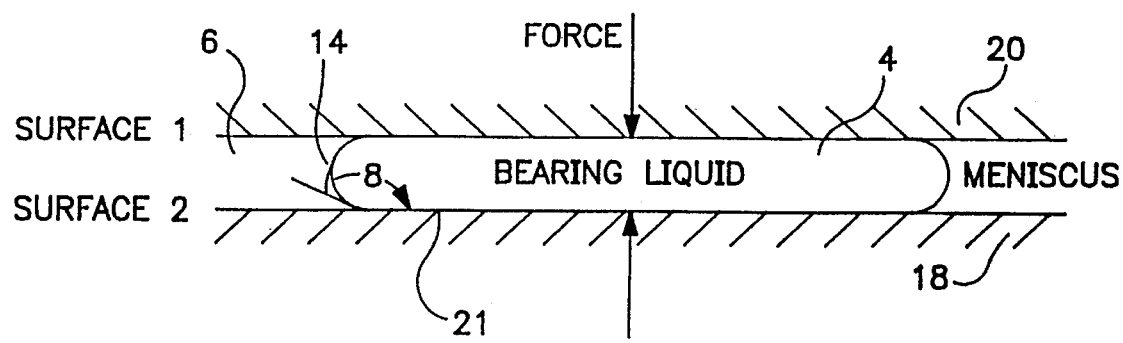
FIG. 1 is a cross section of a bearing in accordance with an embodiment of the invention.

The mating surface of two members 18 and 20, which are roughly parallel but separated by a gap 6, are shown in FIG. 1. A limited quantity of bearing fluid 4, is placed in the gap 6, as shown. It is highly preferable that the fluid 4, chosen to fill the gap 6, be one that produces a contact angle 8, (defined as an angle formed by surface 18, and the point tangent to the meniscus 14, where the meniscus 14, contacts the edge 21, of the flat surface 18), which is greater than 90° and less than 180°. With the contact angle being greater than 90°, the pressure within the bearing fluid 4, is higher than the pressure of the surrounding medium of the gap 6. In a preferred embodiment a liquid metal, for example mercury or gallium is used as the bearing fluid, since the usual high surface energy of these liquids cause the effect to be more pronounced than it is with a lower surface energy liquid. The pressure of the high surface energy liquid forces the two surfaces 18 and 20 apart, and must be balanced by externally applied forces if the system is to be maintained in equilibrium. Operation as a bearing is illustrated as the two surfaces 18 and 20, are brought closer together, which produces an effective stiffness. This is a result of two phenomena: closer spacing, together with the fixed contact angle, increases the curvature of the meniscus, increasing the pressure within the bearing fluid; and closer spacing increases the area over which the pressure acts.

Figure 2A:
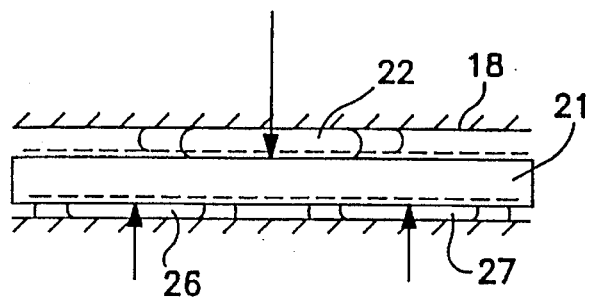
FIG. 2 is a cross section of multiple bearings in accordance with a further embodiment of the present invention.
Figure 2B:
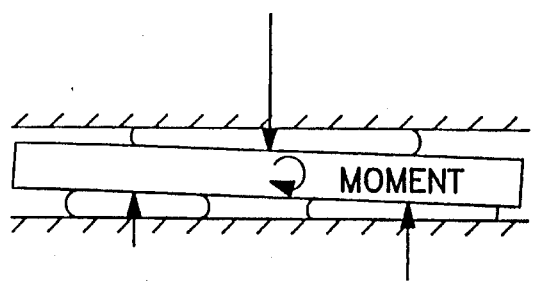

Turning to FIG. 2A, an illustration of multiple pools of bearing fluid 22, 26 and 27, are shown. A vertical displacement of the moveable member 21 in the direction of surface member 18, raises the force on the bearing fluid 22 and lowers the corresponding lower surface bearing fluids 26, 27. The new position of the meniscuses of bearings 22, 26 and 27, and the new position of the moveable member 21 after the vertical displacement, are shown in dashed lines. As seen in FIG. 2B the tilting of the movable member produces a correcting moment.

In some applications the pool of bearing fluid may suffer lateral forces that, without proper constraint, would cause the fluid to migrate to an unsatisfactory position. The most common examples are: forces of gravity on bearing surfaces which are not horizontal; forces due to tilting the bearings as illustrated in FIG. 2B, and forces induced by the action of lateral relative velocities. Allowance for these occurrences may be desired. For such instances, the location of a pool can be constrained through the use of a recessed region as shown in FIG. 3. Such a region is hereinafter referred to as a bearing pad 30. In FIG. 3A, a bearing pad 30, is shown which is not completely full of bearing liquid 4. A rightward velocity of the of upper member 18, produces, as a result of viscosity, a pressure gradient and the fluid velocity profile indicated by the horizontal arrows, which pushes the fluid 4, toward the right side of the pad 30. Since the gap 6, is smaller outside the pad 30, than inside, the constant contact angle allows a greater curvature for the meniscus 14 than for meniscus 16. In addition, the outside corner on the right side accommodates a wide range of local pressures and curvatures for the meniscus while preventing the bearing fluid from being pushed further. As a result, the pressure differences across the two meniscuses are unequal. The pressure within the bearing fluid 4, can be higher toward the right side 14, than for the meniscus on the left side 16. Thus, unless the driving action becomes excessive the fluid is confined within the pad 30. Should the velocity be reversed, the fluid does not immediately break away from its previous position, but can hold as shown in FIG. 3B. If pushed hard enough, the bearing fluid will move to the left side of the pad but again be stopped at its edge 36. A similar action occurs when the same bearing pad is completely filled with the bearing fluid as shown in FIG. 3C. The greatest velocity that can be accommodated produces the positions of the meniscuses 38 and 40 as shown in FIG. 3C. It is preferable that the angle formed between non-recessed bottom surface 20, and the edge 7, of the gap 30, form an "included angle" 9, of less than 180°.

Figure 4:
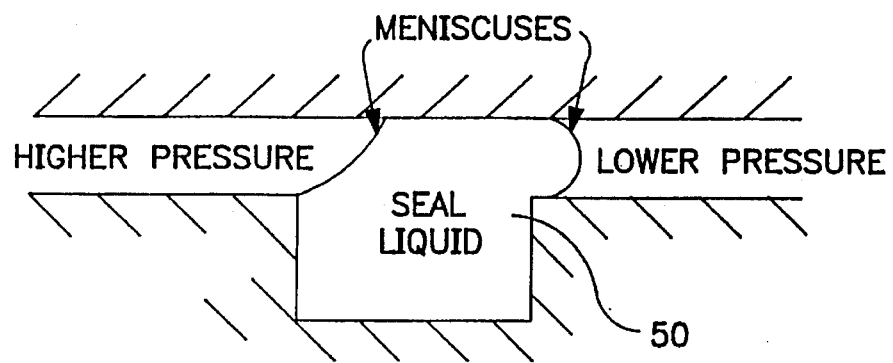
FIGS. 4 and 5a–5c are cross sections of seals in accordance with an embodiment of the present invention.

The surface energy of the bearing fluid can also sustain a pressure difference across it, without allowing any of the surrounding fluid to leak past. As illustrated in FIG. 4, the device becomes a fluid seal 50. The limiting pressure which can be held by a single interface of such a seal is $(2\gamma \cos\rho)/h$, where $\gamma$ is surface tension, $\rho$ is the contact angle, and $h$ is the height of the seal. For mercury with a 10 μm gap, this turns out to be about 37 kPa or 5 psi. Further reference can be made to "Potential Building Blocks For Microhydraulic Building Blocks For Microhydraulic Actuators" Forbes T. Brown *Micromechanical Systems* 1993, The 1993 ASME winter Annual Meeting, November 28–Dec. 3, 1993, which is incorporated herein by reference.

The seal 50, can be modified so that a pressure difference of one of the two polarities disrupts the seal without dislodging the pool of seal fluid from one of the two surface. This is illustrated in FIG. 5A where the pool 50, contacts only a cusp 56, of one of the solid surfaces 60, in the absence of any pressure difference. When the pressure applied to the right side is greater than that on the right side, as shown in FIG. 5B, the seal is enhanced. When the pressure applied to the right is greater than on the left, the pool is dislodged from the cusp 56, allowing flow. Such a device could function as a fluid diode or check valve.

Figure 5C:
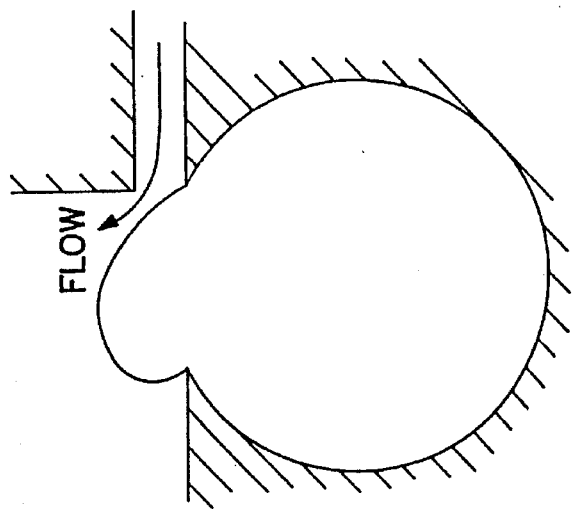
Figure 5B:
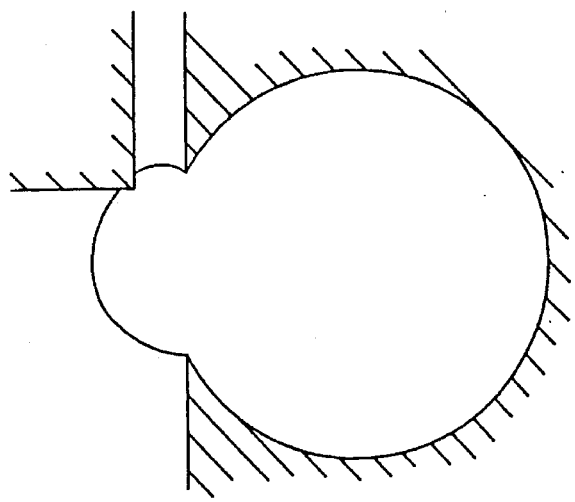
Figure 5A:
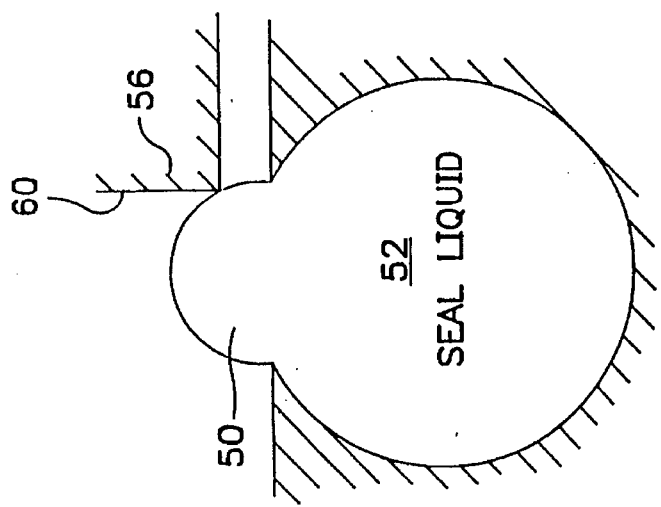

In a fluid diode or check valve such as shown in FIG. 5, the ends can be anchored in dead ended chambers, so that the fluid is less apt to be dislodge from such solid members. Also, the sealing may be enhanced if the end effects on the column of fluid are compensated by a curved sealing edge.

Figure 6:
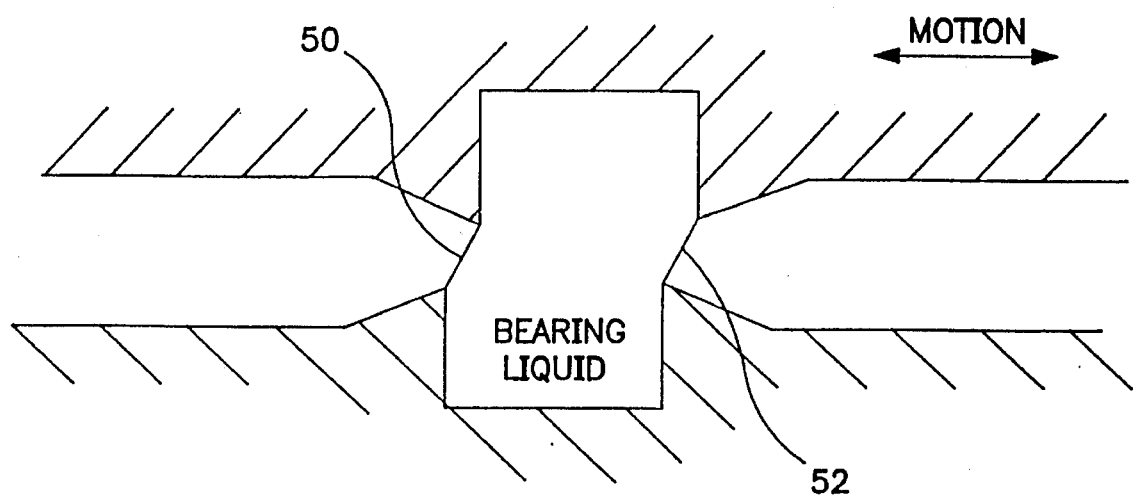
FIG. 6 is a cross section of an improved bearing or seal in accordance with an embodiment of the present invention.

In some bearing applications, considerable flexibility is desirable between the two members. The embodiment of a surface tension bearing shown in FIG. 6 allows horizontal motion with extremely little resistance. The small restraining force results from the angle of the meniscuses 50, 52. This configuration can serve as a seal at the same time.

An example of an array of bearings and seals of the present invention are shown in FIG. 7. The position of a piston 30, is controlled by the admission of a working fluid through one or more ports (not shown) into the volumes on each of its two sides, in the conventional manner employed in hydraulic and pneumatic systems. The unusual rectangular shape of the cross-section of the piston is intended to facilitate machining, particularly at the micro-scale. The piston is constrained in five of its six degrees of freedom from touching the fixed walls by rectangular shaped bearings pads 62, 64 largely filled with bearing fluid from one pad to another is presented by their separateness. Three seals 66, 68, 70, are shown, one around the piston 30, and one each around the two rectangular shafts 72, 74. These seals should preferably extend all the way around the movable member in order to prevent leakage of the working fluid.

Figure 8:
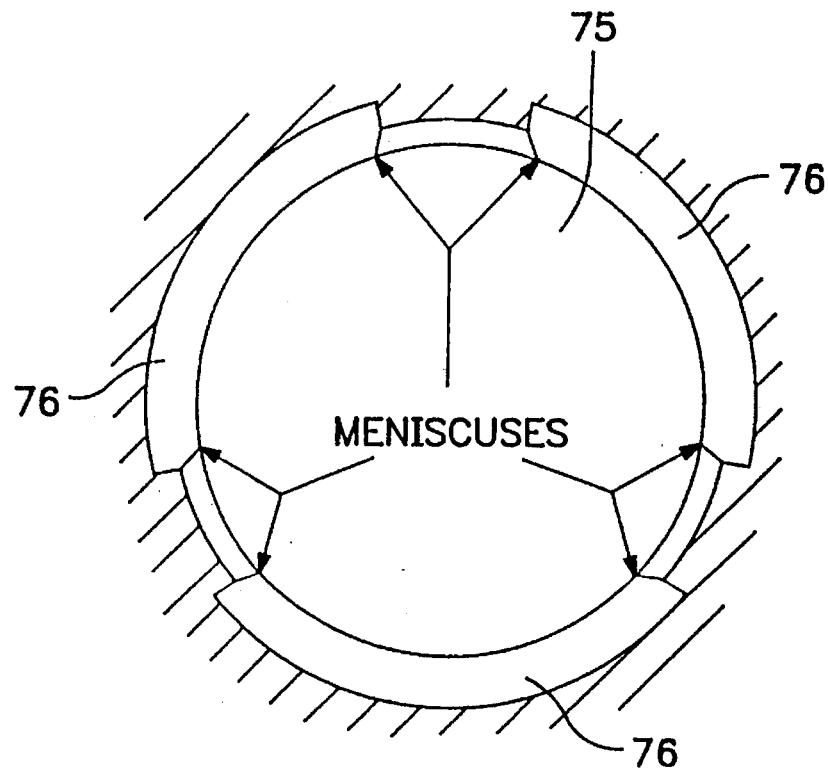

Another embodiment of the bearings and seals is shown in FIG. 8. Here, a circular shaft 75, is supported by three bearing pads 76, and a seal extends around the shaft (not shown). Although the pads are shown to be rectangular in plan view, many shapes for this pad can be envisioned; circular pads may be particularly easy to fabricate.

Figure 9:
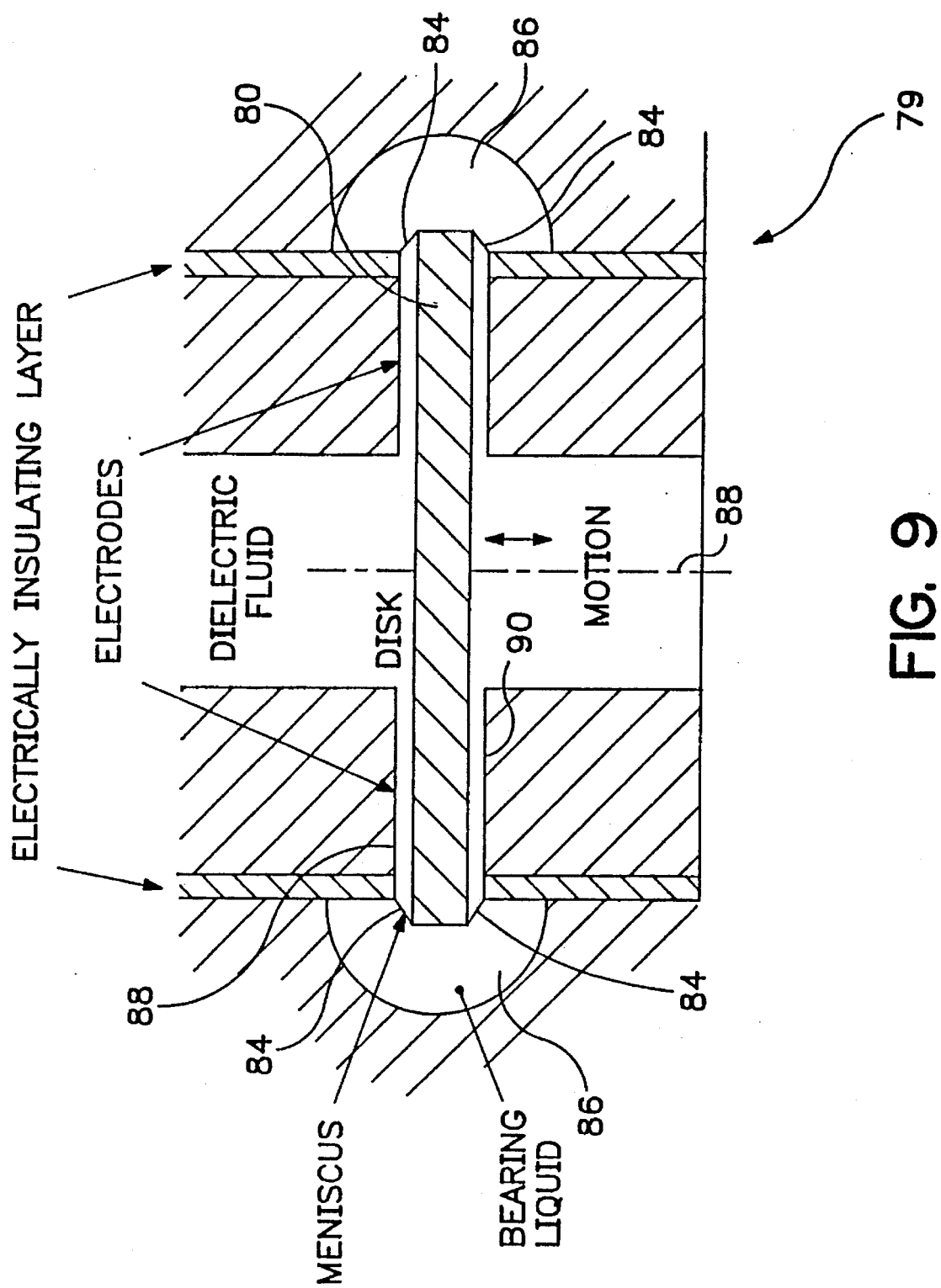

An application of the surface-tension bearing with lateral motion and angled meniscuses is shown in FIG. 9. Here, a circular disk 80, is loosely suspended by meniscuses 84, which extend around the disk's entire periphery. The surface tension forces also act to center the disk 80, relative to the axis 88, of device 79. The meniscuses also act to seal the region above the disk from that below. For example, the disk could be electrically grounded through the liquid metal 86, allowing a variable capacitor to be formed between the disk 80, and either the horizontal surface 88, above the disk or the horizontal surface 90, below it, or both. A voltage (not shown) placed across this capacitor would result in an electrostatic force which would pull the disk 80, up or down. If a dielectric working fluid is present, the device would act like a pump. Such a pump may prove useful, for example, in micromechanical systems.

Figure 10:
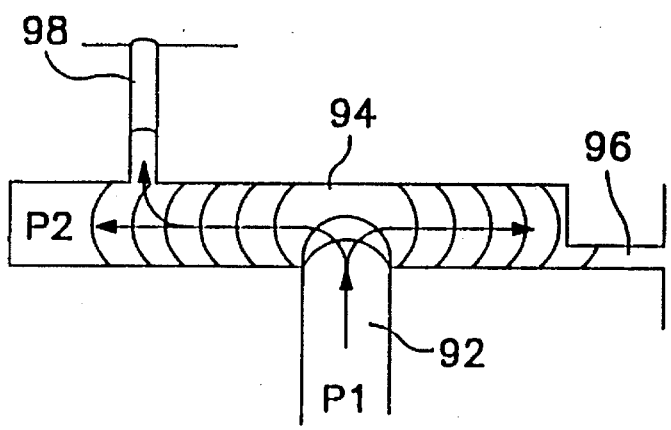
FIG. 10 is a drawing illustrating displacement of a fluid.

The charging of the pads of a bearing with the proper amounts of bearing fluid offers particular challenges. Charging ports likely should be sealed off after use. Exit ports may be needed to allow egress for the gas or liquid which is being displaced. Two types of forces are available to induce the transfer: surface tension and an externally applied pressure or vacuum. Surface tension forces also can cause the advancing meniscus to stop at a desired location. Two examples are suggested in FIG. 10, where a bearing fluid 92, such as liquid mercury or gallium displaces another liquid 94, in a chamber. The rightward advance of the interface is stopped by the abrupt narrowing of the chamber 96. The leftward advance stops when the sole egress port 98, for that region is covered abruptly by the bearing fluid. At this point, the first fluid no longer can escape, and the advance of the interface in the chamber stops. The bearing fluid instead is forced into the exit channel 98. It may emerge out the other end, or if the exit hole is small and the applied pressure difference not too large, the flow will stop spontaneously at one end or the other of this channel due to surface tension forces. The same general situation applies to the channel on the right, also.

An alternative to employing surface tension forces to stop the charging process at the desired point is to employ a charger which supplies only the desired quantity, such as a syringe with a preset charge. However, this method is apt to require elaborate or difficult controls.

Figure 11A:
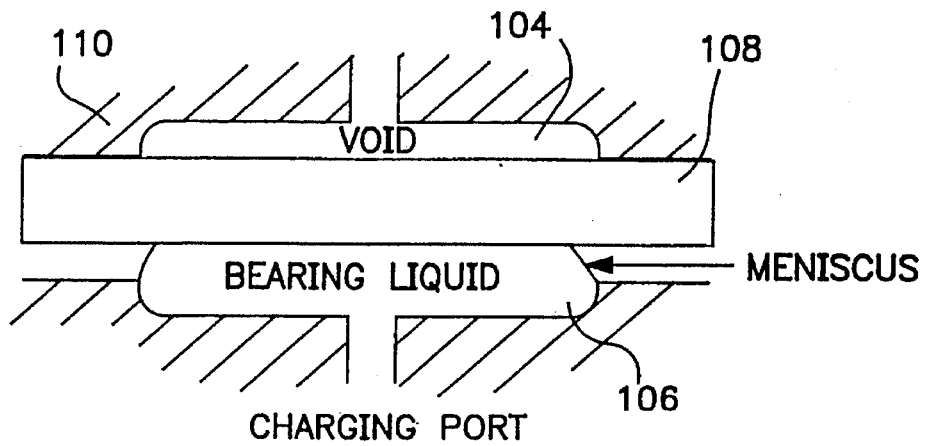
FIGS. 11a–11b is a cross section of an improved bearing pad in accordance with an embodiment of the present invention.
Figure 11B:
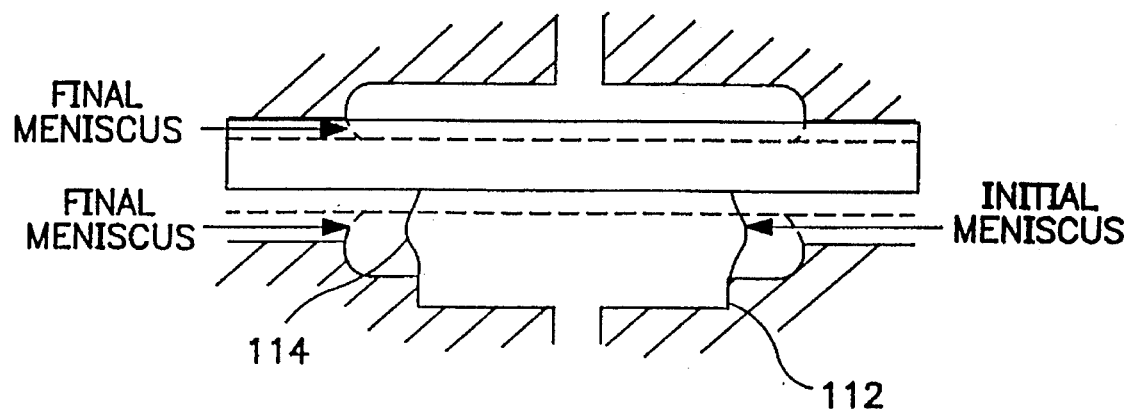

An important problem arises when surface tension forces are used to limit the charging of a chamber that is not fixed in size or shape due to a movable boundary. This situation and a proposed solution are illustrated in FIG. 11. Two bearing pads 104, 106 are shown for the support of a member in the vertical direction while allowing relative motion in either of the other two normal horizontal directions. If the lower pad 106 is charged first, the movable member 108 would be pushed upward against the upper surface 110 in the process, and would over-fill, as shown in FIG. 11A. In practice it would likely be difficult to place an appropriate temporary constraint on the motion. A subsequent attempt to fill the upper pad 104 would fail to produce the needed balance. If the upper pad 104, were charged first, the result is even more obviously the same, although with the roles of the two pads reversed. If an attempt is made to charge the two pads simultaneously, an instability can be shown to exist that likely would have the same result as if they were charged serially. What happens is that the slightest asymmetry reduces the resistance to charging of the chamber that is relatively over-charged, accentuating the imbalance. The solution employs the use of a second smaller recessed region 112, within the main recess of the bearing pad which is to be charged first, such as shown in part (b) of the figure. A similar recess (not shown) could be used in the opposing pad, but if so is superfluous with respect to the charging. During the charging, the movable member 108, is allowed to displace hard against the surface 110. The charging pressure is chosen so that the interface stops at the boundary of the inner recess. The extent of the inner recess is chosen such that the proper volume of bearing fluid results when the upper pad is charged. Subsequently, the lower meniscus 114, proceeds outward to the desired position, as shown by the dashed lines.

Over a long period of time, it is possible that enough of the bearing fluid would be lost by evaporation or molecular diffusion into the surrounding fluid as to impair the operation of the bearing. In a further embodiment, the surrounding fluid would be isolated partially or totally from the environment and would be saturated with molecules from the bearing fluid, and the bearing fluid would be saturated with molecules from the surrounding fluid. This would provide an indefinite equilibrium in the quantity and composition of the bearing fluid, increasing the life of the bearing.

The reference has been described with reference to preferred embodiments, but variations within the spirit and the scope of the invention will occur to those skilled in the art. For example, it will be understood that the forces and motions illustrated in the diagrams can be obtained using any suitable transducer, pressure differential, etc.

I claim:

1. A seal for use in a gap between at least two non-contacting solid members, comprising; a pool of fluid, said pool being anchored in a first of said members and contacting a second of said members, said pool being detachable from said second members in response to a pressure differential within the gap.

2. A bearing in a gap between two non-contacting solid members for use in a micromechanical pump, comprising; a disk member suspended between said non-contacting solid members, a pool of a first liquid between a first of said solid members and a first surface of said disk member, a second fluid in contact with a second surface of said disk member, said second fluid being dielectric, and means for applying an electrical potential across said disk member and said second fluid, said disk member being moveable in response to said electrical potential.

3. The bearing as defined in claim 2, wherein said first fluid is conductive.

4. The bearing as defined in claim 3, wherein the surface tension of the first fluid acts to center and support the disk member between the non-contacting solid members.

* * * * *